US009361825B2

(12) United States Patent
Jeong et al.

(10) Patent No.: US 9,361,825 B2
(45) Date of Patent: Jun. 7, 2016

(54) METHOD OF DETECTING DATA BIT DEPTH AND INTERFACE DEVICE FOR DISPLAY DEVICE USING THE SAME

(71) Applicant: LG Display Co., Ltd., Seoul (KR)

(72) Inventors: Yangseok Jeong, Paju-si (KR); Yongduk Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 130 days.

(21) Appl. No.: 14/029,013

(22) Filed: Sep. 17, 2013

(65) Prior Publication Data

US 2014/0146058 A1 May 29, 2014

(30) Foreign Application Priority Data

Nov. 28, 2012 (KR) ........................ 10-2012-0136118

(51) Int. Cl.
*G06F 13/14* (2006.01)
*G09G 3/20* (2006.01)
*G09G 5/00* (2006.01)

(52) U.S. Cl.
CPC .............. *G09G 3/2096* (2013.01); *G09G 5/006* (2013.01); *G09G 5/008* (2013.01); *G09G 2320/0693* (2013.01); *G09G 2340/0428* (2013.01); *G09G 2370/14* (2013.01)

(58) Field of Classification Search
CPC ........... G06F 3/14; G06F 3/147; G09G 5/363; G09G 3/3688; G01R 13/405; H04L 7/033; H04L 7/0008; H04L 7/0337; H04J 3/0682; H04N 5/06; H04N 5/126; H04N 9/64; G01B 11/022
USPC ........... 345/30, 36, 37, 38, 42, 45, 51, 52, 55, 345/204, 205, 212, 213, 214, 215, 418, 501, 345/519, 520, 522, 530, 531, 532, 534; 348/135, 138, 521, 537, 539, 540; 375/354, 355, 356, 358, 359, 362
See application file for complete search history.

(56) References Cited

U.S. PATENT DOCUMENTS 6,295,010 B1 * 9/2001 Thiesfeld ........................ 341/58
6,380,990 B1 * 4/2002 Bessel ........................... 348/806

(Continued)

FOREIGN PATENT DOCUMENTS

EP 2154889 A1 2/2010
JP 2010-096951 A 4/2010

OTHER PUBLICATIONS

V-by-One® HS Standard, Version 1.4, THine Electronics, Inc., Dec. 15, 2011 (http://www.thine.co.jp/en/products/pr_details/V-by-OneHS.html) (last visited: Mar. 12, 2015).*

(Continued)

*Primary Examiner* — Xiao Wu
*Assistant Examiner* — Sarah Lhymn
(74) *Attorney, Agent, or Firm* — Fenwick & West LLP

(57) ABSTRACT

A method of detecting a data bit depth and an interface device for a display device using the same are disclosed. The method includes confirming a physical connection between a transmitting terminal and a receiving terminal and then transmitting a clock data recovery (CDR) training pattern signal from the transmitting terminal to the receiving terminal, outputting clocks from a CDR circuit of the receiving terminal using the CDR training pattern signal, receiving an alignment training pattern signal subsequent to the CDR training pattern signal from the transmitting terminal to the receiving terminal, and counting bits of pixel data included in the alignment training pattern signal or the clocks and determining a data bit depth of input data based on a count result, in the interface receiving terminal.

8 Claims, 3 Drawing Sheets

(56) References Cited

U.S. PATENT DOCUMENTS

| | | | | |
|---|---|---|---|---|
| 2002/0171761 | A1* | 11/2002 | Suzuki et al. | 348/484 |
| 2008/0062158 | A1* | 3/2008 | Willis | 345/204 |
| 2008/0225734 | A1 | 9/2008 | Daugherty et al. | |
| 2010/0046557 | A1* | 2/2010 | Guan et al. | 370/476 |
| 2010/0150290 | A1* | 6/2010 | Kim et al. | 375/371 |
| 2010/0238951 | A1* | 9/2010 | Ozawa | 370/465 |
| 2012/0146980 | A1* | 6/2012 | Lee et al. | 345/211 |
| 2012/0155586 | A1* | 6/2012 | Felder et al. | 375/355 |

OTHER PUBLICATIONS

Using a Counter to Reduce Pin Counts for SPI Slave Selection (May 2012), pp. 1-3, (http://electronics.stackexchange.com/questions/31415/using-a-counter-to-reduce-pin-counts-for-spi-slave-selection) (last visited Nov. 5, 2015).*

German Office Action, German Application 10 2013 105 559.1, Mar. 20, 2015, 10 pages.

* cited by examiner

METHOD OF DETECTING DATA BIT DEPTH AND INTERFACE DEVICE FOR DISPLAY DEVICE USING THE SAME

CROSS-REFERENCE TO RELATED APPLICATION

This application claims the benefit of Korean Patent Application No. 10-2012-0136118 filed on Nov. 28, 2012, which is incorporated by reference herein in its entirety.

BACKGROUND OF THE INVENTION

1. Field of the Invention

Embodiments of the invention relate to a method of detecting a data bit depth and an interface device for a display device using the same.

2. Discussion of the Related Art

A low-voltage differential signaling (LVDS) interface has been used as an interface for data transmission in most of liquid crystal displays. However, the LVDS interface cannot properly cope with an increase in the amount of data resulting from a double speed drive or a quad-speed drive for a high resolution, color depth extension, response time improvement of the liquid crystal displays. When the LVDS interface is adapted to a 120 Hz Full HD (1920×1080) panel of 10-bit color depth, 24 pairs of lines, i.e., 48 lines total, are required. The LVDS interface is used to transmit clock signals as well as the data. Thus, as the amount of data to be transmitted increases, a frequency of the clock signal of the LVDS interface increases. Hence, electromagnetic interference (EMI) has to be controlled.

According to a standard of the LVDS interface, the LVDS interface transmits signals changing around a voltage of 1.2V to ground. A standard of a signal voltage required in the LVDS interface took a large limit to a design of large scale integration (LSI) because of the achievement of a fine process of the LSI. In this situation, an interface such as a digital video interface (DVI), a high definition multimedia interface (HDMI), DisplayPort was proposed and was put to practical use.

The DVI and the HDMI each have a skew adjustment function, and high-bandwidth digital content protection (HDCP) may be embedded in HDMI as a content protection function. Therefore, the DVI and the HDMI have a great advantage in the transmission of an image signal between devices. However, in addition to licensing cost, DVI and HDMI require substantial power consumption and have excessive functions for the transmission of the image signal between the devices.

DisplayPort was standardized as a specification capable of replacing the LVDS interface in video electronics standards association (VESA). Because the HDCP is embedded in DisplayPort in consideration of transmission of protected content between the devices in the same manner as the HDMI, DisplayPort also has excessive functions and requires substantial power consumption. Further, when DisplayPort performs the signal transmission at a low frequency, a loss is generated in DisplayPort because a transmission speed of the DisplayPort is fixed. Thus, a receiving terminal of the DisplayPort has to reproduce clock signals.

V-BY-ONE data transfer interface was developed by the company THINE ELECTRONICS, INC. The V-BY-ONE data transfer interface has better signal transmission quality than the existing LVDS interface due to the introduction of an equalizer function and has also realized 3.75 Gbps per 1 Pair. Further, the V-BY-ONE data transfer interface solved the problem of the skew adjustment generated in the clock transmission of the LVDS interface due to the adoption of clock data recovery (CDR). Because the V-BY-ONE data transfer interface does not have the clock transmission function required in the existing LVDS interface, an EMI noise resulting from the clock transmission may be reduced. Because the V-BY-ONE data transfer interface can efficiently cope with an increase in an amount of data and the higher speed drive, the V-BY-ONE data transfer interface is drawing attention as an alternative technology of the existing LVDS interface.

The V-BY-ONE data transfer interface currently applied to the liquid crystal display may transmit 8-bit data or 10-bit data. Each of a transmitting terminal and a receiving terminal of the V-BY-ONE data transfer interface is provided with a separate external option terminal, so that the data bit depth is recognized from the receiving terminal of the V-BY-ONE data transfer interface. Namely, information of the data bit depth is transmitted through lines connected to the external option terminals of the transmitting terminal and the receiving terminal of the V-BY-ONE data transfer interface. In this instance, because option pins are added to the transmitting terminal and the receiving terminal of the V-BY-ONE data transfer interface, the number of cable lines and connector lines for connecting the transmitting terminal and the receiving terminal increases. Further, when the data bit depth is changed in a method of transmitting the data bit depth information using the separate external option terminals, the option pins may be again set.

SUMMARY OF THE INVENTION

Embodiments of the invention provide a method of detecting a data bit depth and an interface device for a display device using the same capable of automatically deciding the data bit depth without a separate option pin.

In one aspect, there is a method of detecting a data bit depth including confirming a physical connection between an interface transmitting terminal and an interface receiving terminal and then transmitting a clock data recovery (CDR) training pattern signal from the interface transmitting terminal to the interface receiving terminal, outputting clocks from a CDR circuit of the interface receiving terminal using the CDR training pattern signal, receiving an alignment training pattern signal subsequent to the CDR training pattern signal from the interface transmitting terminal and transmitting the alignment training pattern signal to the interface receiving terminal, and counting bits of pixel data included in the alignment training pattern signal or clock cycles and determining a data bit depth of input data based on a count result in the interface receiving terminal.

In another aspect, there is a display device including an interface receiving terminal embedded in a timing controller, the interface receiving terminal coupled to an interface transmitting terminal embedded in a host system.

The interface transmitting terminal confirms a physical connection between the interface transmitting terminal and the interface receiving terminal and then sequentially transmits a clock data recovery (CDR) training pattern signal, an alignment training pattern signal, and display data to the interface receiving terminal.

The interface receiving terminal generates clocks using a built-in CDR circuit, to which the CDR training pattern signal is input, and counts bits of pixel data included in the alignment training pattern signal or clock cycles to decide a data bit depth of input data based on a count result.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
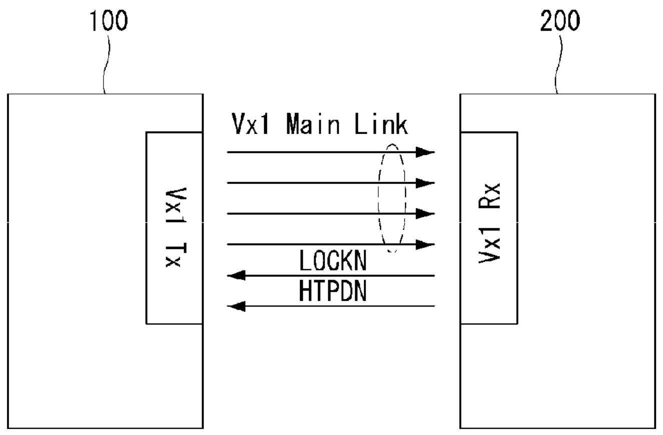
FIG. 1 illustrates an interface device according to an exemplary embodiment of the invention.
Figure 2:
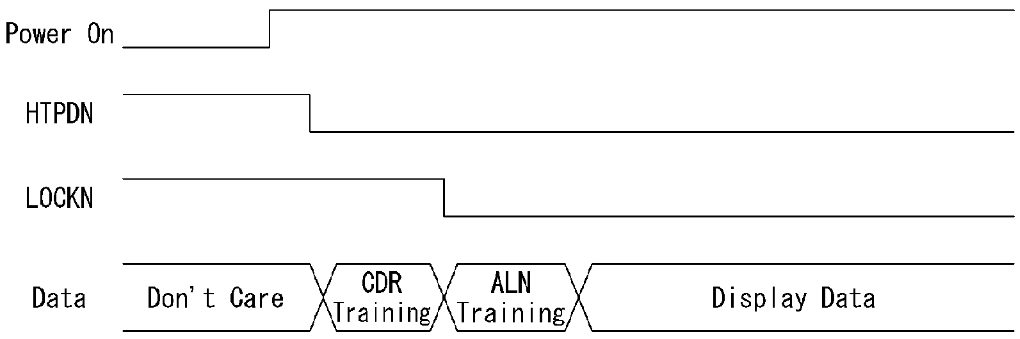
FIGS. 2 and 3 are waveform diagrams illustrating a sequence of a V-BY-ONE data transfer interface.
Figure 3:
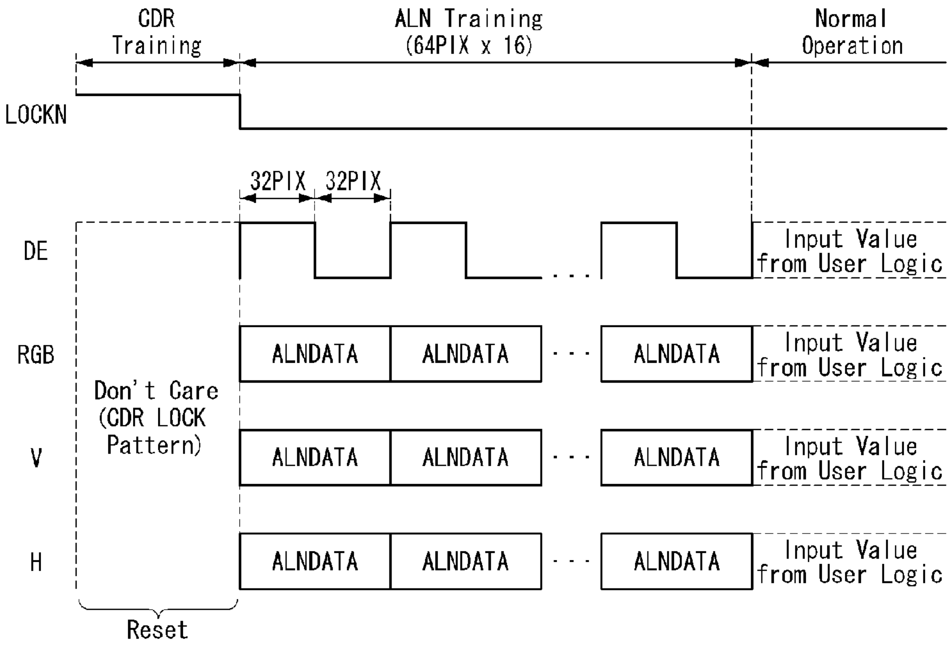

As shown in FIGS. 1-3, an interface device according to an exemplary embodiment of the invention includes a transmitting terminal 100 (Vx1 Tx) and a receiving terminal 200 (Vx1 Rx). The embodiment of the invention is described using a V-BY-ONE data transfer interface as an example of the interface device, but is not limited thereto.

Auxiliary signal transmission links used in the transmission of auxiliary signals LOCKN and HTPDN as well as a number of main links used in data transmission couple the transmitting terminal 100 and the receiving terminal 200, so as to implement a data communication using the V-BY-ONE data transfer interface. The V-BY-ONE data transfer interface transmits data to be displayed on a display device in conformity with a sequence shown in FIG. 2.

The transmitting terminal 100 generates an auxiliary signal HTPDN and auxiliary signal LOCKN. With the transmitting terminal 100 powered (not shown), the receiving terminal 200 powers on to receive data using the V-BY-ONE data transfer interface. The receiving terminal 200 pulls the auxiliary signal HTPDN to a low level, and the transmitting terminal 100, in turn, transmits a clock data recovery (CDR) training pattern signal data over the Vx1 Main Link to the receiving terminal 200 in response to the auxiliary signal HTPDN of the low level. The receiving terminal 200 includes a CDR circuit embedded therein, so as to recover clock signals. The CDR circuit of the receiving terminal 200 receives the CDR training pattern signal and locks a phase and a frequency of its output based on the CDR training pattern data. The CDR circuit of the receiving terminal 200 subsequently pulls the auxiliary signal LOCKN to a low level. When the auxiliary signal LOCKN is reduced to the low level, the transmitting terminal 100 transmits an alignment ALN training pattern signal to the receiving terminal 200 for a predetermined period of time and then transmits data ‘Display Data’ displayed on the display device to the receiving terminal 200.

Now referring to FIG. 3, alignment data ALNDATA, which is not displayed on the display device, is transmitted during the alignment training pattern signal ALN phase. The alignment data ALNDATA is determined according to the communication protocol of the V-BY-ONE data transfer interface by the transmitting terminal 100 and causes the receiving terminal 200 to determine a ‘Display Data’ receiving start timing. When the alignment data ALNDATA is received, the receiving terminal 200 determines a start timing of pixel data ‘Display Data’ (refer to FIG. 2). The receiving terminal 200 may be coupled to a display panel of a display device configured to display an image based on the received ‘Display Data’. Thus, the pixel data ‘Display Data’, which the receiving terminal 200 receives subsequent to the alignment training pattern signal ALN, is displayed on the display panel. One embodiment of the invention counts the number of bits of the pixel data ‘Display Data’ transmitted during alignment training pattern signal ALN phase using the receiving terminal 200 and, in turn, determines a data bit depth using the receiving terminal 200 without a separate option pin.

The alignment pattern signal transmission using the V-BY-ONE data transfer interface may be configured as follows. 32 pixel data PIX are transmitted during a high period of a data enable signal DE, and 32 pixel data PIX are transmitted during a low period of the data enable signal DE. The data enable signal DE is synchronized with pixel data of 1 line on the display panel to indicate a input timing of 1 line pixel data. One example of pixel data includes red (R) data, green (G) data, and blue (B) data. When each of R, G, and B data is 8-bit, the data bit depth is 24 bit/3 byte. Further, when each of R, G, and B data is 10-bit, the data bit depth is 30 bit/4 byte. An encoder of the transmitting terminal 100 may encode 8-bit data to 10-bit data in the ANSI 8/10 encoding manner. The pixel data of 24 bit/3 byte may be converted to 30-bit data by the encoder, and the pixel data of 30 bit/4 byte may be converted to 40-bit data through the ANSI 8/10 encoding manner. Thus, when the receiving terminal 200 counts the number of bits of the pixel data in the alignment training pattern signal, the receiving terminal 200 may determine the bit depth of data (e.g., the ‘Display Data’) that will be received during normal operation.

For example, the transmitting terminal 100 transmits 32 pixel data to 960 bits (=32 PIX×30 bits) during an alignment pattern training period in a 3-byte mode (8-bit input). Alternatively, the transmitting terminal 100 transmits 32 pixel data to 1280 bits (=32 PIX×40 bits) during the alignment pattern training period in a 4-byte mode (10-bit input). In turn, the receiving terminal 200 counts clock signals output from the data bit or a built-in circuit during the high period or the low period of the data enable signal DE in the alignment pattern training period and decides whether the data bit depth is the 3-byte mode or the 4-byte mode depending on an accumulated count value.

When the accumulated count value in the high period or the low period of the data enable signal DE is 900 to 1050, the receiving terminal 200 decides the data bit depth as the 3-byte mode. On the other hand, when the accumulated count value is 1200 to 1400, the receiving terminal 200 decides the data bit depth as the 4-byte mode. In another embodiment, the receiving terminal 200 compares a reference value corresponding to the 3-byte mode and/or the 4-byte mode with an accumulated count value from the bit depth measurement period (e.g., the high period or low period) to determine the data bit depth. For example, when the accumulated count value in the high period or the low period of the data enable signal DE is equal to or less than 1100 (the reference value), the receiving terminal 200 may decide the data bit depth as the 3-byte mode. On the other hand, when the accumulated count value is greater than 1100, the receiving terminal 200 may decide the data bit depth as the 4-byte mode.

Further, as shown in FIG. 3, V is a vertical sync signal indicating a 1 vertical time (1 input frame period) and H is a horizontal sync signal indicating a 1 horizontal time (1 line display time).

Figure 4:
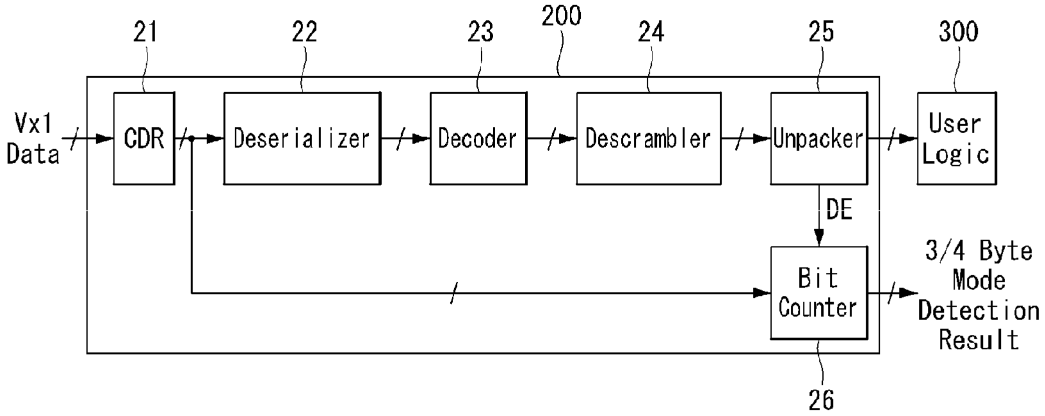
FIG. 4 is a circuit diagram showing in detail a receiving terminal of the interface device shown in FIG. 1.

FIG. 4 is a circuit diagram showing in detail the receiving terminal 200. As shown in FIG. 4, the receiving terminal 200 includes a CDR circuit 21, a deserializer 22, a decoder 23, a descrambler 24, an unpacker 25, and a bit counter 26, according to one embodiment.

The CDR circuit 21 pulls the auxiliary signal HTPDN low to receive the CDR training pattern signal in an initialization process of the V-BY-ONE data transfer interface (e.g., after the power-on of a transmitting terminal 100 and receiving terminal 200 of the V-BY-ONE data transfer interface) and recovers the clock signals embedded in the CDR training pattern signal. Once the CDR circuit 21 locks a phase and a frequency of the recovered clock signal, the CDR circuit 21 pulls the auxiliary signal LOCKN to the low level. The frequency of the clock signal recovered by the CDR circuit 21 is generated as the same frequency as a data rate of the pixel data. Thus, the counting of the clock signals output from the CDR circuit 21 may obtain the same result as the counting of the data bits.

The deserializer 22 converts serial data received through the main links into 10-bit parallel data. The decoder 23 decodes 10-bit data, which is encoded by the encoder of the transmitting terminal 100 in the ANSI 8/10 encoding manner, to 8-bit data, which is original data before encoding by the encoder of the transmitting terminal 100. The descrambler 24 recovers data, which is scrambled by a 16-bit linear feedback shift register (LFSR) in the transmitting terminal 100, into original data.

The unpacker 25 extracts data received from the transmitting terminal 100 into pixel data, control data, and timing data. The data received from the transmitting terminal 100 includes the alignment data ALNDATA and the display data 'Display Data' shown in FIGS. 2 and 3. The timing data includes a vertical sync signal Vsync, a horizontal sync signal Hsync, and the data enable signal DE. The unpacker 25 rearranges pixel data in conformity with a preset data mapping manner. The pixel data, the control data, and the timing data output from the unpacker 25 are transmitted to a user logic unit 300. The user logic unit 300 may be a timing controller of a flat panel display as shown in FIG. 5.

The bit counter 26 receives the data enable signal DE from the unpacker 25 and receives the clock signal produced by the CDR circuit 21. As described above, the bit counter 26 counts bits of the pixel data or clocks output from the CDR circuit 21 in the high period or the low period of the data enable signal DE and determines a data bit depth of input data based on an accumulated count value of the pixel data and/or clock cycles.

The display device according to the embodiment of the invention may be implemented based on a flat panel display, such as a liquid crystal display (LCD), a field emission display (FED), a plasma display panel (PDP), an organic light emitting display, and an electrophoresis display (EPD). Other flat panel displays may be used.

Figure 5:
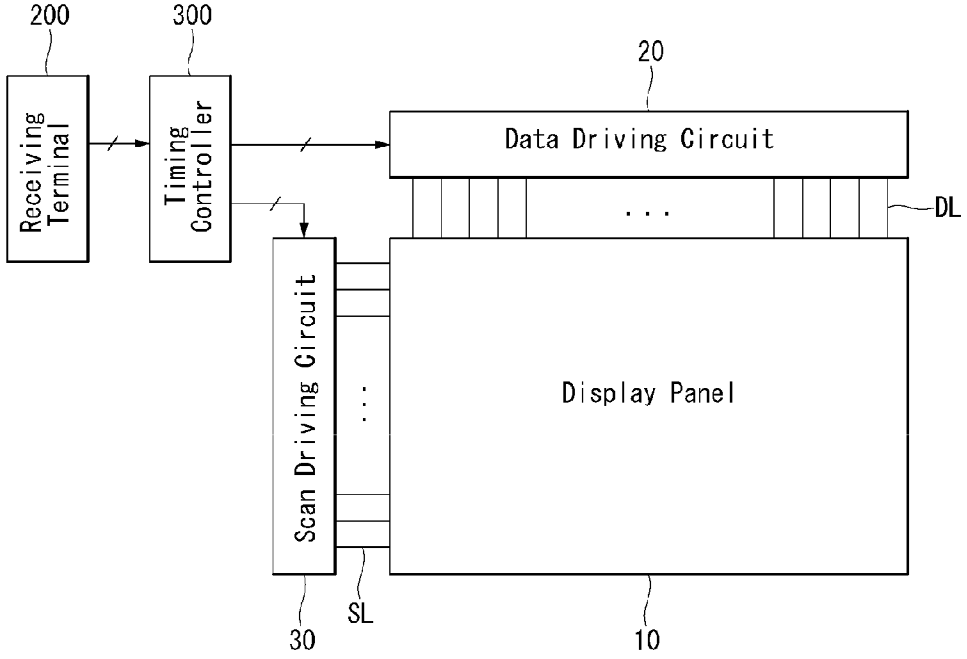
FIG. 5 is a block diagram of a display device according to an exemplary embodiment of the invention.

As shown in FIG. 5, the display device according to an embodiment of the invention includes a display panel 10, a data driving circuit 20, a scan driving circuit 30, a receiving terminal 200, and a timing controller 300.

A transmitting terminal (not shown) may be disposed in an external host system (not shown) and transmits encoded pixel data, timing data, and the control data to the receiving terminal 200. The host system may be implemented as one of a television system, a set-top box, a navigation system, a DVD player, a Blu-ray player, a personal computer (PC), a home theater system, and a phone system. The host system includes a system-on chip (SoC) provided with a scaler embedded therein and thus converts digital video data into a format suitable for displaying on the display panel 10.

As shown, the receiving terminal 200 is coupled to the timing controller 300. In an embodiment, the receiving terminal 200 is configured to receive data from the transmitting terminal of a host system (not shown), e.g. 100 as shown in FIG. 1, via a V-BY-ONE data transfer interface. For example, the host system may transmit the digital video data, including timing signals Vsync and Hsync, and control data signals DE to the receiving terminal 200. The receiving terminal 200 decodes the received data (e.g., as described above with reference to FIG. 1-4) to generate the pixel data, control data, and timing data utilized for displaying an image on the display panel 10. In an embodiment, the receiving terminal 200 may be embedded in the timing controller 300.

Additionally, as described above, embodiments of the invention counts clock cycles in the receiving terminal 200 or bits of input data input to the receiving terminal 200 during a training phase to determine the data bit depth of input data based on the accumulated count value. As a result, the embodiment of the invention may automatically decide the data bit depth in the receiving terminal of the interface device of the display device without the separate option pin.

The timing controller 300 transmits the pixel data received through the receiving terminal 200 to the data driving circuit 20 and controls operation timings of the data driving circuit 20 and the scan driving circuit 30 using the timing data received through the receiving terminal 200.

The data driving circuit 20 converts pixel data (i.e., digital data) received from the timing controller 300 into gamma compensation voltages and generates an analog data signal. The data driving circuit 20 supplies the data signals to the data lines DL. The scan driving circuit 30 sequentially supplies a scan signal synchronized with the data signal to the scan lines SL. A pixel array of the display panel 10, which includes pixels formed in pixel areas defined by data lines DL and scan lines SL, displays an image corresponding to the supplied data.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of detecting a data bit depth comprising:

receiving, at an interface receiving terminal configured to receive display data in two or more data bit depth modes without a separate option pin indicating the data bit depth, a clock data recovery (CDR) training pattern signal from an interface transmitting terminal;

outputting clocks from a CDR circuit of the interface receiving terminal using the CDR training pattern signal;

receiving, at the interface receiving terminal, an alignment training pattern signal subsequent to the CDR training pattern signal from the interface transmitting terminal, the alignment training pattern signal including a number of bits of pixel data and alignment data, the alignment data indicative of a start time for the interface receiving terminal to receive display data that is received subsequent to the alignment training pattern signal;

separating a data enable signal from the alignment training pattern signal in the interface receiving terminal, the data enable signal indicating input timing of one line of pixel data for display on a display device;

determining, at the interface receiving terminal without the separate option pin indicating the data bit depth, the data bit depth of the subsequently received display data by counting the number of bits of the pixel data accumulated in one of a high period and a low period of the data enable signal included in the alignment training pattern signal; and receiving, at the interface receiving terminal, the display data based on the alignment data, the display data received subsequent the alignment training pattern signal and displayed on the display device.

2. The method of claim 1, wherein when the accumulated count value in one of the high period and the low period of the data enable signal is in the range of 900 to 1050, the data bit depth is determined as a 3-byte mode, and wherein when the accumulated count value in one of the high period and the low period of the data enable signal is in the range of 1200 to 1400, the data bit depth is determined as a 4-byte mode.

3. The method of claim 1, wherein determining the data bit depth comprises comparing a predetermined reference value with the accumulated count value and determining the data bit depth based on a comparison result.

4. The method of claim 3, wherein when the accumulated count value in one of the high period and the low period of the data enable signal is equal to or less than 1100, the data bit depth is determined as the 3-byte mode, and wherein when the accumulated count value in one of the high period and the low period of the data enable signal is greater than 1100, the data bit depth is determined as the 4-byte mode.

5. A display device comprising:

a data driving circuit;

a scan driving circuit;

a timing controller comprising an interface receiving terminal configured to receive display data in two or more data bit depth modes without a separate option pin indicating the data bit depth, the interface receiving terminal coupled to an interface transmitting terminal embedded in a host system, the interface receiving terminal sequentially receiving, from the interface transmitting terminal, a clock data recovery (CDR) training pattern signal, an alignment training pattern signal including a number of bits of pixel data and alignment data, and display data, the alignment data indicative of a start time for the interface receiving terminal to receive the display data that is received subsequent to the alignment training pattern signal, the interface receiving terminal comprising:

a CDR circuit generating clocks using the CDR training pattern signal, an unpacker separating a data enable signal from the alignment training pattern signal, the data enable signal indicating input timing of one line of pixel data for display on the display device, and a bit counter determining the data bit depth of the subsequently received display data by counting the number of bits of pixel data accumulated in one of a high period and a low period of the data enable signal included in the alignment training pattern signal; and a display panel displaying the display data received subsequent to the alignment training pattern signal, the display data received based on the alignment data at the interface receiving terminal.

6. The display device of claim 5, wherein when the accumulated count value in one of the high period and the low period of the data enable signal is in the range of 900 to 1050, the bit counter determines the data bit depth as a 3-byte mode, and wherein when the accumulated count value in one of the high period and the low period of the data enable signal is in the range of 1200 to 1400, the bit counter determines the data bit depth as a 4-byte mode.

7. The display device of claim 5, wherein the bit counter compares a predetermined reference value with the accumulated count value and determines the data bit depth based on a comparison result.

8. The display device of claim 7, wherein when the accumulated count value in one of the high period and the low period of the data enable signal is equal to or less than 1100, the bit counter determines the data bit depth as the 3-byte mode, and wherein when the accumulated count value in one of the high period and the low period of the data enable signal is greater than 1100, the bit counter determines the data bit depth as the 4-byte mode.

* * * * *